United States Patent
Dugonjic-Bilic et al.

(10) Patent No.: US 12,203,031 B2
(45) Date of Patent: Jan. 21, 2025

(54) INVERSE POLYMER EMULSION WITH SPECIFIC EMULSIFIER PACKAGE FOR POLYMER FLOODING

(71) Applicant: TouGas Oilfield Solutions GmbH, Frankfurt am Main (DE)

(72) Inventors: Fatima Dugonjic-Bilic, Offenbach (DE); Benjamin Gerlach, Aschaffenburg (DE); Marita Neuber, Dreieich (DE)

(73) Assignee: TouGas Oilfield Solutions GmbH, Frankfurt am Main (DE)

( * ) Notice: Subject to any disclaimer, the term of this patent is extended or adjusted under 35 U.S.C. 154(b) by 529 days.

(21) Appl. No.: 17/416,840

(22) PCT Filed: Dec. 12, 2019

(86) PCT No.: PCT/EP2019/084906
§ 371 (c)(1),
(2) Date: Jun. 21, 2021

(87) PCT Pub. No.: WO2020/126825
PCT Pub. Date: Jun. 25, 2020

(65) Prior Publication Data
US 2022/0081607 A1    Mar. 17, 2022

(30) Foreign Application Priority Data
Dec. 21, 2018 (EP) .................. 18215217

(51) Int. Cl.
| | |
|---|---|
| *C09K 8/54* | (2006.01) |
| *C08F 20/56* | (2006.01) |
| *C09K 8/584* | (2006.01) |
| *C09K 8/588* | (2006.01) |
| *E21B 43/16* | (2006.01) |

(52) U.S. Cl.
CPC .............. *C09K 8/584* (2013.01); *C08F 20/56* (2013.01); *C09K 8/54* (2013.01); *C09K 8/588* (2013.01); *E21B 43/16* (2013.01); *C09K 2208/32* (2013.01)

(58) Field of Classification Search
CPC .......... C09K 8/584; C09K 8/54; C09K 8/588; C09K 2208/32; C09K 8/36; C08F 20/56; C08F 2/30; C08F 220/56; C08F 220/585; E21B 43/16
See application file for complete search history.

(56) References Cited

U.S. PATENT DOCUMENTS

| | | | | |
|---|---|---|---|---|
| 4,439,332 | A * | 3/1984 | Frank | C09K 8/58 166/275 |
| 6,022,833 | A | 2/2000 | Mueller et al. | |
| 6,465,397 | B1 * | 10/2002 | Patterson | C09K 8/5753 526/278 |
| 6,488,946 | B1 | 12/2002 | Milius et al. | |
| 2004/0260017 | A1 * | 12/2004 | Mertens | C08J 3/03 524/832 |
| 2017/0158947 | A1 * | 6/2017 | Kim | C09K 8/588 |

FOREIGN PATENT DOCUMENTS

WO 2017211563 A1 12/2017

OTHER PUBLICATIONS

Z. Han et. al., Physicochemical properties and phase behavior didecyldimethylammonium chloride/alkyl polyglycoside surfactant mixtures, J Surfact. Deterg., 2015, 18, 641-649.*
Zhiguo Han et al: "Physicochemical Properties and Phase Behavior of Didecyldimethylammonium Chloride/Alkyl Polyglycoside Surfactant Mixtures", Journal of Surfactants and Detergents, vol. 18, No. 4, Jul. 1, 2015, pp. 641-649, XP055679761, DE.
Monika Santa et al: "SPE 145039 Sustainable Surfactants in Enhanced Oll Recovery", SPE Enhanced Oil Recovery Conference, Jul. 19, 2011, pp. 19-21, XP055112568.

* cited by examiner

Primary Examiner — Kumar R Bhushan
(74) Attorney, Agent, or Firm — Hammer & Associates, P.C.

(57) ABSTRACT

A method to manufacture stable water-in-oil polymer emulsion with low viscosity by using special stabilizing surfactant package is disclosed.

22 Claims, No Drawings

INVERSE POLYMER EMULSION WITH SPECIFIC EMULSIFIER PACKAGE FOR POLYMER FLOODING

The present invention relates to a method to manufacture stable water-in-oil polymer emulsion with low viscosity and improved performance in oil recovery processes by using stabilizing surfactant package and their use in the treatment of subterranean reservoirs.

Water-in-oil emulsions, which are also called inverse emulsions, are useful delivery systems for water-soluble synthetic polymers such as polyacrylamides, polyacrylates or copolymers of acrylamide with other water-soluble monomers. These polymer emulsions are useful in commercial applications such as cosmetics, cleaning, wastewater treatment, papermaking and enhanced oil recovery.

The use of water-soluble polymers as inverse emulsions has several advantages compared to polymers in powder form:
  i. The emulsion is liquid and can be pumped and easily metered
  ii. The inversion of the emulsion is fast and dissolution of the polymer is not time consuming and does not require equipment for maturation
  iii. There is no risk of dust formation during handling
  iv. The polymer dissolves homogeneously without risk to form gel-like particles These properties are of special advantage when water-soluble polymers are used in locations with difficult logistical connection, for example very remote areas, places with extreme weather conditions or space constraint locations. This often applies to polymers for enhanced oil recovery as polymer flooding projects take place in locations typically far away from places with well-developed infrastructure and often even on offshore platforms.

For enhanced oil recovery there are further requirements regarding the water-soluble polymer. As the polymer travels several months through the formation, it must be stable under the existing conditions and withstand thermal, biological and mechanical degradation. Furthermore, there no pressure increase should occur during injection of the polymer solution. The absence of gel-like particles that might form during dissolution of powder polymer is obviously a big advantage for good injectivity performance.

The injectivity behaviour of polymers for enhanced oil recovery processes is tested in the lab by pumping the polymer solution through sand packs or core samples from the formation and measuring the pressure relative to the fluid without polymer. The permeability of the sand packs or the cores corresponds to the permeability of the formation and therefore is a good indication how the polymer solution behaves in the formation.

At constant pumping rate, the pumping pressure increases with the start of injection of polymer solution due to its higher viscosity compared to fluid without polymer, also called base fluid. Ideally, after one pore volume, the polymer solution has replaced the base fluid and the pumping pressure remains constant during further injection of polymer solution.

The differential pumping pressure of the polymer solution relative to the differential pumping pressure of the base fluid is also called resistance factor RF $$RF = \frac{\Delta p(\text{polymer solution})}{\Delta p(\text{base fluid})}$$

Increasing pumping pressure with time indicates that the polymer plugs the pores in the sand pack or the core. The higher the pressure increase with time, the more severe is the blocking of the porous sample. This can be expressed by calculating the resistance factor after injection of different pore volumes of polymer solution PV:

$$RF_x = \frac{\Delta p(\text{polymer solution after} \times PV)}{\Delta p(\text{base fluid})}$$

By calculating the difference between $RF_{x2}$ and $RF_{x1}$ the blocking behaviour of polymer solutions can be characterized and also compared $$\Delta RF = RF_{x2} - RF_{x1}$$

with x1, x2 being pore volumes of polymer solution injected, x2>x1

Another figure for characterizing the injectivity behaviour of polymer solutions is the residual resistance factor RRF. It is defined as the differential pumping pressure of the base fluid after injection of the polymer solution relative to the differential pumping pressure of the base fluid before the polymer solution $$RRF = \frac{\Delta p(\text{base fluid after polymer solution})}{\Delta p(\text{base fluid before polymer solution})}$$

The RRF value is an indication for the reduction of permeability of the porous sand pack or core due to polymer retention. The lower the RRF value is the less is the sand pack or core affected by the polymer and the better is the injection behaviour of the polymer.

Water-in-oil polymer emulsions are liquids. The aqueous phase containing the water-soluble polymer is finely dispersed in an organic oil phase not miscible with the water phase. The water droplets are stabilized by suitable surfactant or surfactant mixtures, also called emulsifier or emulsifier mixtures. Under stirring and/or in the presence of suitable inverter surfactant, the polymer is released from the micelles and forms the desired polymer solution.

It is obvious that the stability of the polymer emulsion is an important objective for every industrial use. The water droplets should not settle during transport and storage to ensure a homogenous polymer concentration in the containers or tanks without the need for redispersing the emulsion before use. This objective arose already shortly after introduction of water-in-oil emulsions. For example, U.S. Pat. No. 3,826,771 claims to provide an emulsion which has a high degree of stability with an aqueous phase content of at least 75% and a high polymer content between 20 and 50%, based on the emulsion. In U.S. Pat. No. 3,826,771, stability is defined as the ability to maintain the dispersion of the polymer particles throughout the emulsion for a period of 3 weeks at which time the dispersion can be reformed with only slight agitation.

As the polymer emulsion is a liquid, it can be pumped and easily metered into water or an aqueous fluid, which is a great advantage compared to polymers in powder form. For easy handling, the viscosity of the water-in-oil emulsion should not be higher than about 2000 cP, otherwise it becomes difficult to pump the emulsion as is pointed out for example in U.S. Pat. No. 5,376,713. The patents states that viscosities of less than 1000 cP measured by Brookfield viscometer are important. It describes the impact of surfactants packages consisting of N,N-diethanol oleic acid amide with other surfactants of different type on the viscosity and stability of polymer emulsions. The oleic acid amide alone is not efficient. Furthermore, it is toxic for aquatic life with long-lasting effects.

To stabilize aqueous droplets in inverse emulsions, typically oil-soluble surfactants are used according to Bancroft's rule which states that the fluid with higher solubility for the surfactant forms the continuous phase. Lipophilic surfactants suitable for inverse emulsions are non-ionic and characterized by a HLB-value between 3 and 8, see Römpp Chemielexikon $9^{th}$ ed., 1990.

HLB-value means the hydrophilic-lipophilic balance of a surfactant and is a measure of the degree to which it is hydrophilic or lipohilic, determined by calculating values for the different regions of the molecule. The most common method was developed by W. C. Griffin in 1949 and results in a ranking of the surfactants between 0 and 20 with 0 corresponds to a completely lipophilic/hydrophobic molecule, and a value of 20 corresponds to a completely hydrophilic/lipophobic molecule. The HLB-values of the surfactants specified by the suppliers according to that method were used in the present invitation.

The stabilizing surfactant molecules cover the surface of the water droplets and keep them at distance by steric repulsion that they cannot coalesce to larger droplets, which more easily separate from the organic phase. As high molecular weight surfactants require large volume, they often stabilize water-in-oil emulsions very efficiently, see for example Landfester and Musyanovych, Adv. Polym Sci (2010), 234, 39-63 who found that nonionic block copolymer stabilizers like poly(ethylene-co-butylene)-b-poly(ethylene oxide) are the most efficient.

Also, mixtures of surfactants are used as emulsifier for water-in-oil emulsions. When the HLB-values of the individual surfactants are different from each other, the overall HLB-value of the mixture corresponds to the weighted average of the single compounds.

There is a broad variety of different surfactant classes described in the literature as emulsifiers for inverse emulsions.

U.S. Pat. No. 4,021,399 describes the use of sorbitan monostearate as emulsifier for water-in-oil polymerization of an acrylamide/acrylic acid copolymer. U.S. Pat. No. 4,078,133 uses sorbitan monostearate as well as sorbitan monooleate to produce vinyl-polymers in inverse emulsion polymerization.

U.S. Pat. No. 5,290,479 describes the use of a surfactant blend consisting of sorbitan fatty acid ester or fatty acid glyceride, a polyethoxylated of sorbitol fatty acid ester and a polyethoxylated alcohol. The surfactant mixture is adjusted to a HLB of 7 to 9 to ensure the highest emulsion stability and viscosity of polymer solution. The findings of U.S. Pat. No. 5,290,479 indicate that the emulsifiers have an impact on the resulting polymers and their properties.

In contrast, U.S. Pat. No. 5,376,713 teaches that sorbitan ester ethylenoxide adducts as co surfactants lead to reduced stability and induces higher bulk viscosity. It claims the use of a surfactant mixture consisting of N,N-diethanol oleic acid amide and a sorbitan-free ethylene oxide adduct of a long chain compound bearing OH— an/or carboxylic groups and having a HLB between 5 and 14.

US 2016/0032170 claims a method for increasing recovery of crude oil using a water-soluble crosslinked polymer prepared in an emulsion, the organic phase containing high molecular weight structured multiester or multiether of a polyol with a molecular weight from 950 Daltons to about 500000 Daltons. Besides other surfactant classes, the patent includes alkylated alkyl polyglycosides and alkoxylated polyglycosides as high molecular weight structured multiethers of a polyol dissolved in the organic phase.

Surprisingly it was found that a combination of a first surfactant having a HLB-value between 3 and 9 with second surfactant having an HLB-value of greater than 11, said second surfactant being an alkyl polyglycoside or a mixture of alkyl polyglycosides, gives rise to stable polymer emulsions with low viscosity and improved performance of the water-soluble polymers in oil recovery processes.

DETAILED DESCRIPTION

Therefore, the present invention relates to a method to prepare water-in-oil polymer emulsions comprising the water-soluble polymer in the aqueous phase, the aqueous phase finely dispersed in the continuous hydrophobic organic phase and the droplets stabilized by a surfactant package containing a first surfactant having a HLB-value between 3 and 9 and a second surfactant being an alkyl polyglycoside having a HLB-value of greater than 11 or a mixture of alkyl polyglycosides having a HLB-value of greater than 11 giving rise to stable polymer emulsions with low viscosity and improved injectivity of the polymer solution from such emulsions in the treatment of subterranean reservoirs, in particular in enhanced oil recovery processes.

A further aspect of the present invention relates to the use of water-in-oil polymer emulsions obtained by the instant method for the treatment of subterranean reservoirs, in particular in enhanced oil recovery processes and relates treatment fluids, especially in treatment fluids for oil recovery processes (EOR). The water-in-oil polymer emulsions of the instant invention are very stable and have a low viscosity. The term "low viscosity" as used in the instant invention refers to polymer emulsion as used herein having a viscosity of less than 1000 mPas measured using Brookfield DV-I viscometer with spindle 2 at 12 rpm at a temperature of 30° C.

Furthermore, the present invention relates to oil recovery processes and the use of the instant water-in-oil polymer emulsion in such oil recovery processes.

The present invention relates also to a method for treatment of subterranean oil and gas reservoirs comprising the steps of
 (i) providing a water-in-oil polymer emulsion containing water-soluble polymer in the aqueous phase, the aqueous phase finely dispersed in the continuous hydrophobic organic phase and the droplets stabilized by a surfactant package containing a first surfactant having a HLB-value between 3 and 9 and a second surfactant being an alkyl polyglycoside having a HLB-value of greater than 11 or a mixture of alkyl polyglycosides having a HLB-value of greater than 11
 (ii) preparing an aqueous treatment fluid by inversion of said emulsion into water that may contains salts and optionally an inverter surfactant composition,
 (iii) adding optionally further additives, e.g. oxygen and/or radical scavenger
 (iv) introducing the aqueous treatment fluid into the subterranean oil and gas reservoir formation.

Polymers and Aqueous Phase

According to the instant invention, the water-soluble polymer is a synthetic polymer, in particular such synthetic polymers are polymers, copolymers or terpolymers based on polyacrylamide and/or its derivatives.

Preferably, the synthetic polymer used in the instant invention is a synthetic polymer comprising:
(I) at least structural units of formula (I)

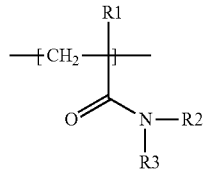

wherein
R1, R2 and R3 independently are hydrogen or $C_1$-$C_6$-alkyl,
(II) from 0 to 95% by weight structural units of formula (II)

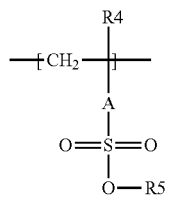

wherein
R4 is hydrogen or $C_1$-$C_6$-alkyl,
R5 is hydrogen, a cation of an alkaline metal, of an earth alkaline metal, of ammonia and/or of an organic amine,
A is a covalent C—S bond or a two-valent organic bridging group,
(III) from 0 to 30% by weight structural units of formula (III)

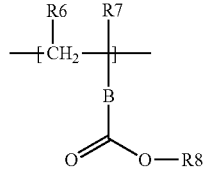

wherein
B is a covalent C—C bond or a two-valent organic bridging group
R6 and R7 are independently of one another hydrogen, $C_1$-$C_6$-alkyl, —COOR9 or —CH$_2$—COOR9, with R9 being hydrogen, a cation of an alkaline metal, of an earth alkaline metal, of ammonia and/or of an organic amine,
R8 is hydrogen, a cation of an alkaline metal, of an earth alkaline metal, of ammonia and/or of an organic amine, or is $C_1$-$C_6$-alkyl, a group —$C_nH_{2n}$—OH with n being an integer between 2 and 6, preferably 2, or is a group —$C_oH_{2o}$—NR10R11, with o being an integer between 2 and 6, preferably 2, and
R10 and R11 are independently of one another hydrogen or $C_1$-$C_6$-alkyl, preferably hydrogen,
(IV) from 0 to 50% by weight structural units of formula (IV)

wherein
R12 and R13 are independently of one another hydrogen, $C_1$-$C_6$-alkyl, —COOR16 or —CH$_2$—COOR16, with
R16 being hydrogen, a cation of an alkaline metal, of an earth alkaline metal, of ammonia and/or of an organic amine,
R14 is hydrogen or, $C_1$-$C_6$-alkyl, and
R15 is —COH, —CO—$C_1$-$C_6$-alkyl or
R14 and R15 together with the nitrogen atom to which they are attached form a heterocyclic group with 4 to 6 ring atoms, preferably a pyridine ring, a pyrrolidone ring or a caprolactame ring,
(V) from 0 to 20% by weight structural units of formula (V)

wherein
D is a covalent C—P bond or a two-valent organic bridging group
R17 is hydrogen or, $C_1$-$C_6$-alkyl, and
R18 and R19 are independently of one another hydrogen, a cation of an alkaline metal, of an earth alkaline metal, of ammonia and/or of an organic amine,
B is a covalent C—P bond or a two-valent organic bridging group,
(VI) optionally further copolymerisable monomers, such copolymerisable monomers being present from 0 to 20% by weight structural units,
with the proviso that the percentage of the structural units of formulae (I) to (VI), preferably the structural units of formulae (I) to (V), refer to the total mass of the copolymer and the percentage of the structural units of formulae (I) to (VI), preferably the structural units of formulae (I) to (V), amounts to 100%.

The $C_1$-$C_6$-alkyl groups being present in the above formulae (I) to (V) are independently of each other and may be straight chain or branched. Examples of alkyl groups are methyl, ethyl, n-propyl, iso-propyl, n-butyl, sec.-butyl, tert-butyl, n-pentyl or n-hexyl. Ethyl and especially methyl are preferred.

The group A may be a C—S-covalent bond or a two-valent organic group.

Examples thereof are $C_1$-$C_6$-alkylene groups or —CO—$C_1$-$C_6$-alkylene groups. The alkylene groups may be straight chain or branched. Examples of A groups are —$C_pH_{2p}$— groups or —CO—NH—$C_pH_{2p}$— groups, with p being an integer between 1 and 6. —CO—NH—$C(CH_3)_2$—$CH_2$— or a C—S-covalent bond is a preferred group A.

The group B in formula (III) may be a C—C-covalent bond or a two-valent organic group. Examples thereof are C1-C6-alkylene groups. These groups may be straight chain or branched. Examples of alkylene groups are —CqH2q-groups, with q being an integer between 1 and 6. Methylene or a C—C-covalent bond is a preferred group B.

The group D in formula (V) may be a C—P-covalent bond or a two-valent organic group. Examples thereof are $C_1$-$C_6$-alkylene groups. These groups may be straight chain or branched. Examples of alkylene groups are —CqH2q-groups, with q being an integer between 1 and 6. Methylene or a C—P-covalent bond is a preferred group D.

The structural units of formula (I) are derived from an ethylenically unsaturated carboxylic acid amide selected from the group of acrylamide, methacrylamide and/or their N—C1-C6-alkyl derivatives or N,N—C1-C6-dialkyl derivatives.

The polymer used in the instant invention may further contain crosslinking monomers, which are monomers with more than one ethylenically unsaturated group. Different compound classes can be used, such as bis-amides, e.g. methylene-bis-acrylamide, bis-, tris- or tetraether derived from two-, three- or fourvalent alcohols and from ethylenically unsaturated halides e.g. trimethylolpropane diallylether, pentaerithriol-triallylether and tetrallyloxyethane, or esters of ethylenically unsaturated carboxylic acids with multivalent alcohol, e.g. di-, tri-, or tetraacrylates derived from ethyleneglycol, from trimethylolpropanol or from pentaerythrite, or di-, tri-, or polyamines which are substituted at the nitrogen atom with ethylenically unsaturated residues, such as N,N'-diallyl-ethylenediamine or triallylamine.

Crosslinker monomers, if present, typically are used in amounts between 0.01 and 5% by weight, preferably between 0.05 and 1% by weight, referring to the total amount of monomers used.

Preferred polymers used in the instant invention further contain structural units of formula (II) to (V) which are derived from an ethylenically unsaturated sulfonic acid and/or its alkaline metal salts and/or their ammonium salts, and/or an ethylenically unsaturated phosphonic acid and/or its alkaline metal salts and/or their ammonium salts, optionally together with further copolymerisable monomers.

Other preferred copolymers used in the instant invention are those, wherein B is a C—P covalent bond or a —CqH2q-group with q being an integer between 1 and 6, preferably 1, and/or wherein A is a C—S covalent bond or a —CO—NH—CpH2p- group with p being an integer between 1 and 6, preferably between 2 and 4, B being most preferably a group —CO—NH—C(CH3)2-CH2-.

Also preferably applied are copolymers with structural units of the formula (II) derived from vinylsulfonic acid, 2-acrylamido-2-methylpropane sulfonic acid, 2-methacrylamido-2-methylpropane sulfonic acid, styrene sulfonic acid and/or their alkaline metal salts and/or their ammonium salts. Especially preferred are structural units of the formula (II) derived from vinylsulfonic acid and/or 2-acrylamido-2-methylpropane sulfonic acid and/or from their alkaline metal salts and/or from their ammonium salts.

The ethylenically unsaturated carboxylic acids of the formula (III) are preferably acrylic acid, methacrylic acid, fumaric acid, maleic acid, itaconic acid and/or crotonic acid as well as their alkaline metal salts and/or their ammonium salts. The alkylesters of ethylenically unsaturated carboxylic acids are preferably alkylesters of acrylic acid, methacrylic acid, fumaric acid, maleic acid, itaconic acid and/or crotonic acid. Especially preferred are alkylesters with 1 to 6 carbon atoms.

The oxyalkylesters of an ethylenically unsaturated carboxylic acids of the formula (III) are preferably 2-hydroxyethylester of acrylic acid, methacrylic acid, fumaric acid, maleic acid, itaconic acid and/or crotonic acid.

The ester of ethylenically unsaturated carboxylic acid of the formula (III) with N-dialkylalkanolamine is preferably N,N-dimethylethanolamine methacrylate, its salt or quaternary ammonium product.

Further preferably applied copolymers with structural units of the formula (IV) are derived from N-vinylamides. The N-vinylamide is preferably N-vinylformamide, N-vinylacetamide, N-vinyl-N-methylacetamide, or N-vinylamide comprising cyclic N-vinylamide groups, preferably derived from N-vinylpyrrolidone, N-vinylcaprolactame or N-vinylpyridine.

Preferably applied are copolymers with structural units of the formula (V) are derived from vinylphosphonic acid and/or its alkaline metal salts and/or its ammonium salts, and/or allylphosphonic acid and/or its alkaline metal salts and/or its ammonium salts.

Preferred copolymers used in the instant invention are those, wherein R1, R2, R3, R4, R10, R11, R14, and R17 are independently of one another hydrogen or methyl or wherein R5, R9, R16, R18 and R19 are independently of one another hydrogen or a cation of an alkali metal, of an earth alkaline metal, of ammonia or of an organic amine.

Still other preferred copolymers used in the instant invention are those, wherein R6 and R12 is hydrogen and R7 and R13 is hydrogen or methyl, or wherein R6 is —COOR9 and R7 is hydrogen or wherein R6 is hydrogen and R7 is —CH2-COOR9 or wherein R12 is hydrogen and R13 is hydrogen or methyl, or wherein R12 is —COOR16 and R13 is hydrogen or wherein R12 is hydrogen and R13 is —CH2-COOR16.

In particular, preferred are water-soluble synthetic copolymers material which are selected from the group consisting of polymers containing:
(I) 10 to 90% by weight of structural formula I, preferred from 20 to 70% by weight,
(II) 1 to 95% by weight of structural formula II, preferred from 10 to 60% by weight,
(III) 0 to 30% by weight of structural formula III, preferred from 0 to 1% by weight, more preferred 0.1 to 1% by weight,
(IV) 0 to 50% by weight of structural formula IV, preferred from 0 to 20% by weight, more preferred from 0.1 to 10% by weight,
(V) 0 to 20% by weight of structural formula V, preferred from 0.1 to 10% by weight,
referred to the total mass of the polymer, with the proviso that the percentage of the structural units of formulae (I) to (V) refer to the total mass of the copolymer and the percentage of the structural units of formulae (I) to (V) amounts to 100%.

According to the instant invention, the water-soluble polymer is a synthetic polymer, in particular such synthetic polymers are polymers, copolymers or terpolymers based on polyacrylamide and/or its derivatives.

The synthetic polymer, in particular the synthetic copolymers and/or terpolymers according the present invention are water-soluble polymers. The term "water-soluble" as used herein means that at a concentration of at least 0.05 wt.-% the polymer is completely soluble in distilled water at 30° C. Complete dissolution as used herein means that the polymer solution visually does not exhibit particles, streaks or flocks.

Preferably, the synthetic polymer, in particular the synthetic copolymers and/or terpolymers according the present invention are not only water-soluble polymers, they further have a high molecular weight. Thus, the average molecular weight of the synthetic polymer, in particular the synthetic copolymers and/or terpolymers according the present invention is higher than 1,000,000 Dalton, preferably higher than 3,000,000 Dalton.

The average molecular weight can be determined via gel permeation chromatography (GPC). Commercially available polymers, e.g. from acrylamide with molecular weight of 1,140,000 Dalton and 5,550,000 Dalton, can be used as standards. For separation of the sample a column consisting of a polyhydroxymethacrylate copolymer network with a pore volume of 30,000 Angstrom (Å) can be used.

The intrinsic viscosity serves as indicator for the average molecular weight of the copolymers according to the invention. The specific viscosity of the polymer solution at different concentrations is determined.

The K-value according to Fikentscher serves as indicator for the average molecular weight of the copolymers according to the invention. To determine the K value, the copolymer is dissolved in a certain concentration (generally 0.5 weight %, in the instant invention 0.1 weight %) and the efflux time at 30° C. is determined by means of an Ubbelohde capillary viscometer. This value gives the absolute viscosity of the solution ($\eta_c$). The absolute viscosity of the solvent is $f_0$.

The ratio of the two absolute viscosities gives the relative viscosity $\eta_{rel}$ $$\eta_{rel} = \eta_c/\eta_o$$

From the relative viscosity, the K value can be determined as a function of the concentration c by means of the following equations:

$$\text{Log } \eta_{rel} = [(75k^2/(1+1.5kc)+k]c$$

$$k=K/1000$$

The K-value of the synthetic polymer, in particular the synthetic copolymers and/or terpolymers, is higher than 180 determined as 0.1 wt.-% copolymer concentration in deionized water, preferably is higher than 200.

The copolymer content of the water-in-oil emulsion is typically from 20 to 50% by weight, preferred between 25 to 35% by weight, related to the emulsion.

The synthetic polymer, preferably the copolymer or terpolymer, is dissolved in the aqueous phase that is finely dispersed in the organic, hydrophobic phase, typically, the size of the aqueous droplet is less than 1 µm, preferred less than 500 nm, in accordance with Arshady, Colloid Polym Sci 270 (1992) 717-732 "Suspension, emulsion, and dispersion polymerization: A methodological survey". Most preferred are droplets having a size of less than 300 nm, in particular within the range from 50 to 250 nm.

The water present in the water-in-oil polymer emulsions generally includes freshwater, but saltwater or combinations with saltwater also may be used. Generally, the water used may be from any source, provided that it does not contain an excess of compounds that may adversely affect other components in the water-in-oil polymer emulsion. Especially, easily soluble inorganic or organic salts like alkali metal and/or ammonium halides, acetates, formats and/or hydroxides may be dissolved in the water.

In some embodiments, the water may be present in the water-in-oil polymer emulsion in an amount in the range of from about 20% to about 50% by weight of the emulsion.

The aqueous phase, that means the water including the synthetic polymer, preferably the copolymer or terpolymer, typically accounts for 40 to 90 wt.-%, preferred 60 to 75 wt.-%, related to the emulsion.

Emulsifier and Organic, Hydrophobic Phase

Suitable water-immiscible liquids may include, but are not limited to, water-immiscible solvents, such as paraffin hydrocarbons, naphthene hydrocarbons, aromatic hydrocarbons, and mixtures thereof. The paraffin hydrocarbons may be saturated, linear, or branched paraffin hydrocarbons. Examples of suitable aromatic hydrocarbons include, but are not limited to, toluene and xylene. The water-immiscible liquid may be present in the water in oil polymer emulsion in an amount sufficient to form a stable emulsion. In some embodiments, the water-immiscible liquid may be present in the water in oil polymer emulsions in an amount in the range from about 10% to about 50% by weight.

Surfactants should be present in the water-in-oil polymer emulsion, among other things, to stabilize the aqueous phase droplets against coalescence and to prevent separation from the organic hydrophobic phase.

According to the instant invention, the surfactant package for the water-in-oil emulsion consists of at least of a first surfactant having a HLB-value between 3 and 9 and a second surfactant being an alkyl polyglycoside or a mixture of alkyl polyglycoside having a HLB-value of greater than 11.

The aforementioned alkyl polyglycosides are considered being environmentally friendly materials. The term "environmentally friendly" as used in the present invention means that the materials are not classified as toxic or harmful to aquatic life according to GHS (Global Harmonized System) and are readily biodegradable according to OECD (Organization for Economic Co-operation and Development) guideline 301. Some surfactants used to stabilize water-in-oil emulsions do not meet this requirement, for example N,N-diethanol oleic acid amide is classified as toxic to aquatic life with long lasting effects.

The first surfactant may be a single surfactant or a mixture of surfactants having a HLB-value between 3 and 9 and being able to form water-in-oil emulsions. That first surfactant may include, but is not limited to fatty acids, fatty acid esters, alcohols, ethers, alkoxylated alcohols, alkylated polyols, alkoxylated polyols, polyol esters, alkoxylated polyol esters, alkylates amine, alkoylated amines, alkylated amides, alkoxylates amides, alkylated sulphur-containing compounds, alkoxylated sulphur-containing compounds, alkylated phosphorous-containing compounds, alkoxylated phosphorous-containing compounds.

Preferred surfactants are sorbitan fatty acid esters and alkoxylated sorbitan fatty acid esters, most preferred are sorbitan monooleate and sorbitan dioleate and mixtures hereof.

The second surfactant is an alkyl polyglycoside or a mixture of alkyl polyglycosides, all of them having an HLB-value of greater than 11 and preferably exhibiting a molecular weight of less than 950 g/mol. Suitable low molecular weight alkyl polyglycosides according to the invention consist of one to 5 glycoside units.

Depending on the fatty alcohol used for the synthesis, the side chain consists of alkyl groups with an uniform number of up to 12 C-atoms or a mixture of alkyl groups of different length with up to 16 C-atoms. Preferred alkyl polyglycosides are octyl- to dodecyl polyglucosides having 1 to 3 glucoside units and mixtures thereof.

In particular preferred are alkyl polyglycoside(s) which consist of 1 to 5 glycoside units, preferred of 1 to 3 glycoside units, most preferred 1 or 2 glycoside units.

In particular preferred are alkyl polyglycoside(s) having an alkyl side chain which consists of alkyl groups with an uniform number of up to 12 C-atoms or different length with up to 16 C-atoms.

Most preferred are alkyl polyglycoside(s) in which the alkyl polyglycoside(s) are octyl- to dodecyl polyglucosides having 1 to 3 glucoside units and mixtures thereof.

Alkyl polyglycosides are synthesized from saccharides and fatty alcohols, both of them are renewable raw materials. They are non-toxic and characterized by good tolerance for eyes, skin and mucous membranes. Furthermore, they distinguish themselves by advantageous environmental properties like ready biodegradability under aerobic as well as under anaerobic conditions.

That is why alkyl polyglycosides are often used for formulations for cosmetic and household products.

In general, alkyl polyglycosides are very stable against hydrolysis in contrast to other surfactants like e.g. sulfates. Furthermore, they are compatible with water of high salinity and high hardness. This allows to use them for a variety of recipes even under sever conditions.

The first and the second surfactant should be present in an amount sufficient to provide the desired stable water-in-oil polymer emulsion. In some embodiments, the first surfactant may be present in an amount in the range of from about 0.5 wt.-% to about 6 wt.-% of the emulsion, the second surfactant may be present in an amount in the range of from about 0.1 wt.-% to about 4 wt.-% of the emulsion, the ratio of the first and the second surfactant may vary between 0.5 to 1 and 8 to 1, preferably between 1 to 1 and 4 to 1. Typically, the total amount of first and second surfactant ranges from 0.6 to 10 wt.-%, preferably from 1 to 9 wt.-%.

In an embodiment, the first and the second surfactant are different in chemical structure, more preferably the first surfactant does not include alkyl polyglycoside or a mixture of alkyl polyglycosides.

Salt, Inverter Surfactant

In some embodiments, the water in oil polymer emulsions further may comprise a salt. Among other things, the salt may be present, among other things, to add stability to the emulsion and/or reduce the viscosity of the emulsion. Examples of suitable salts, include, but are not limited to, ammonium chloride, potassium chloride, sodium chloride, ammonium sulfate, and mixtures thereof. In some embodiments, the salt may be present in the water-in-oil polymer emulsions in an amount in the range of from about 0.5 wt.-% to about 2.5 wt.-% of the emulsion.

In some embodiments, the water in oil polymer emulsions further may comprise an inverter. Among other things, the inverter may facilitate the inverting of the emulsion upon addition to the aqueous treatment fluids of the present invention. Upon addition to the aqueous treatment fluid, the emulsion should invert, releasing the copolymer into the aqueous treatment fluid. Examples of suitable inverters include, but are not limited to, alkoxylated alcohols, nonionic surfactant with an HLB of from 12 to 14, and mixtures thereof. The inverter should be present in an amount sufficient to provide the desired inversion of the emulsion upon contact with the water in the aqueous treatment fluid. In some embodiments, the inhibitor may be present in an amount in the range of from about 0.5 wt.-% to about 10 wt.-% by weight of the emulsion.

Inverse Emulsion Polymerization

In some embodiments, inverse emulsion polymerization may be used to prepare a suitable water-in-oil polymer emulsion. Suitable emulsion polymerization techniques may have a variety of different initiation temperatures depending on, among other things, the amount and type of initiator used, the amount and type of monomers used, and a number of other factors known to those of ordinary skill in the art. The inverse emulsion polymerization may include the following steps
- (i) preparation of an aqueous monomer solution, if necessary, adjusting pH value of the aforementioned monomer solution,
- (ii) preparation of an organic solution consisting of a water-immiscible organic liquid that does not interfere with the polymerization reaction, said organic solution containing a surfactant package,
- (iii) addition of the aqueous phase of step (i) to the organic phase of Step (ii) to prepare a water-in-oil emulsion,
- (iv) removal of oxygen and initiation of the polymerization reaction by addition of one or more compounds that form radicals
- (v) adjusting reaction temperature by cooling or heating to allow complete conversion of the monomers into a polymer,
- (vi) optionally addition of an inverter surfactant for facilitated inversion or further additives, wherein
the surfactant package containing a first surfactant having a HLB-value between 3 and 9 and a second surfactant having a HLB-value of greater than 11, said second surfactant is an alkyl polyglycoside or a mixture of alkyl polyglycosides.

A variety of different mixtures may be used to prepare the water-in-oil polymer emulsion of the present invention.

Suitable mixtures may include acrylamide, further monomers, water, a water-immiscible liquid, and an emulsifier. Optionally, the mixture further may comprise an inhibitor, a base (e.g., sodium hydroxide) to neutralize the acidic monomers forming the salt form of the friction reducing copolymer, an activator to initiate polymerization at a lower temperature, and an inverter. Those of ordinary skill in the art, will know the amount and type of components to include in the mixture based on a variety of factors, including the desired molecular weight and composition of copolymer and the desired initiation temperature.

Treatment Fluid

A treatment fluid for treatment of subterranean oil and gas reservoirs, in particular for enhanced oil recovery processes, is prepared by inverting the water-in-oil polymer emulsion using water or an aqueous solution under appropriate shearing.

Inversion means that the synthetic polymer, in particular the synthetic copolymers and/or terpolymers, is released from the micelles to an aqueous treatment fluid. Preparing such aqueous synthetic polymer, in particular the synthetic copolymers and/or terpolymers, solution may comprise providing the inverse polymer emulsion and the water or aqueous solution, combining the inverse polymer emulsion with the water or aqueous solution to from the aqueous treatment fluid.

The water for preparing the treatment fluid according to this invention can be fresh water, e.g. river water, or natural occurring brines like sea water, formation water, produced water and/or flow back from a well after a stimulation process and mixtures thereof containing different concentrations of salts. In addition, further salts can be added to achieve improved performance of the treatment fluid. Therefore, the water for preparing the polymer solution and the treatment fluid may contain salts comprising mono-, di-, or trivalent cations and or anions, non-limiting examples are lithium, sodium, potassium, strontium, ammonium, calcium, magnesium, barium, boron, aluminium, iron, fluoride, chloride, bromide, sulphate, carbonate, acetate, formate. TDS (total dissolved solids) may range from 50 ppm e.g. for fresh water to 330 000 ppm for high saline brines.

The aqueous solution may further contain water miscible solvent as alcohols, e.g. methanol, ethanol, n- and i-propanol, glycol.

The aqueous polymer solution may further contain additives that are necessary for the treatment. Those additives may include buffer, surfactants, biocides, radical scavengers, and/or oxygen scavengers.

The presence of an inverting surfactant may facilitate the hydration. Inverting surfactants can be added to the water or directly to the polymer emulsion.

The inverter surfactant may also be added to the water before addition of the polymer emulsion. Examples of suitable inverters include, but are not limited to, alkoxylated alcohols, nonionic surfactant with an HLB of from 12 to 14, and mixtures thereof. The inverter should be present in an amount sufficient to provide the desired inversion of the emulsion upon contact with the water in the aqueous treatment fluid. In some embodiments, the inhibitor may be present in an amount in the range of from about 0.01% to about 2% by weight of the treatment fluid.

The concentration of the copolymer in the aqueous treatment fluid is typically from 0.001 to 10% by weight, preferred from 0.005 to 5% by weight and most preferred from 0.01 to 2% by weight, referred to the aqueous polymer solution.

The viscosity of the polymer containing treatment fluid ranges from about 0.5 to 100 mPas depending on the conditions of the well treatment, preferred from about 1 to 10 mPas.

Method

The aqueous treatment fluids of the present invention can be used in any subterranean treatment where a fluid with increased viscosity is desired. The preferred use is for enhanced oil recovery processes.

Furthermore, the present invention relates to the use of such water-in-oil polymer emulsion in oil recovery processes.

The present invention relates also to a method for treatment of subterranean oil and gas reservoirs, in particular for enhanced oil recovery processes, comprising the steps of:
(i) providing a water-in-oil polymer emulsion containing the water-soluble polymer in the aqueous phase, the aqueous phase finely dispersed in the continuous containing a first surfactant having a HLB-value between 3 and 9 and a second surfactant being an alkyl polyglycoside having a HLB-value of greater than 11 or a mixture of alkyl polyglycosides having a HLB-value of greater than 11 (ii) preparing an aqueous treatment fluid by inversion of said emulsion into water that may contains salts and optionally a inverter surfactant composition,
(iii) adding optionally further additives, e.g. oxygen and/ or radical scavenger
(iv) introducing the aqueous treatment fluid into the subterranean oil and gas reservoir formation.

The aqueous treatment fluid may be introduced into the portion of the subterranean formation at a rate and pressure suitable for sweeping residual oil out of the treated portion of the formation.

Test Methods

The following testing methods are used:

The average molecular weight can be determined via gel permeation chromatography (GPC). Commercially available polymers, e.g. from acrylamide with molecular weight of 1,140,000 Dalton and 5,550,000 Dalton, can be used as standards. For separation of the sample a column consisting of a polyhydroxymethacrylate copolymer network with a pore volume of 30,000 Angstrom (Å) can be used.

The K-value (K) according to Fikentscher serves as indicator for the average molecular weight of the copolymers according to the invention. To determine the K-value, the copolymer was dissolved in a certain concentration (generally 0.5 wt.-%, in the instant invention 0.1 wt.-%) and the efflux time at 30° C. was determined by means of an Ubbelohde capillary viscometer. This value gives the absolute viscosity of the solution ($\eta_c$). The absolute viscosity of the solvent is $\eta_o$. The ratio of the two absolute viscosities gives the relative viscosity $\eta_{rel}$ $$\eta_{rel} = \eta_c/\eta_o$$

From the relative viscosity, the K-value can be determined as a function of the concentration c by means of the following equations:

$$\text{Log } \eta_{rel} = [(75k^2/(1+1.5kc)+k]c$$

$$k = K/1000$$

The viscosity of inverse polymer emulsions and polymer solutions was determined using a Brookfield DV-I viscometer and an Ubbelohde capillary viscometer.

For the Ubbelohde capillary viscometer the capillary of appropriate width was chosen, about 30 ml of the sample were filled into the capillary. The capillary was then allowed to adjust temperature to 30° C. for 10 min in a water bath. The time of the defined sample volume for passing through the capillary was taken and then multiplied with the capillary constant to give the viscosity in mPa*s.

The Brookfield DV-I measures viscosities by driving a spindle which is immersed in the test fluid through a calibrated spring. Spindle and rotational speed are chosen according to the viscosity range of the test fluid. 200 ml of the fluid were placed in a heated beaker and allowed to warm to 30° C.

The stability of polymer emulsions was determined by evaluating samples that were stored at ambient temperature for a longer period of time. The height of the organic phase that separated from the emulsion was measured and its volume was calculated. The separated organic phase was then related to the volume of the sample. The separated relative volume is given in volume % (vol.-%) related to the storage time.

The size of the aqueous droplets is determined by dynamic light scattering using a Malvern ZetaSizer NS at a scattering angle of 90°.

The molecular weight of the alkyl polyglycoside is given by the reactant's glycoside and fatty alcohol.

Injectivity tests were done using quartz sand packs with a permeability of about 1000 mD at ambient temperature. The column for the sand pack was made from plexiglass, the length of the fill was about 4 cm, the volume about 22 ml. Synthetic sea water or polymer solution was pumped with a rate of 0.33 ml/h. The ambient pressure as well as the pressure before the sand pack were recorded by a data logger system.

HLB-values of the first and second surfactant were provided according to Griffin in which the term "HLB value"

denotes the hydrophilic-lipophilic balance of a substance and thus gives information on the lipophilic or hydrophilic tendency of a substance. The higher the HLB-value, the better the hydrophilicity. The HLB value can be determined by calculating the values for the different regions of the molecule, as described by Griffin in 1949 (Griffin, William C. (1949), "Classification of Surface-Active Agents by 'HLB", Journal of the Society of Cosmetic Chemists, 1 (5): 311-26) and 1954 (Griffin, William C. (1954), "Calculation of HLB Values of Non-Ionic Surfactants", Journal of the Society of Cosmetic Chemists, 5 (4): 249-56), and as described by Davies in 1957 (Davies JT (1957), "A quantitative kinetic theory of emulsion type, I. Physical chemistry of the emulsifying agent", Gas/Liquid and Liquid/Liquid Interface, Proceedings of the International Congress of Surface Activity, pp. 426-38). The HLB-value of a mixture of substances can be determined by multiplying the HLB-value of the single substance with their weight shares in the mixture and summing up the obtained values.

As a preferred reference, the HLB-value can be determined by using the Griffin's method for non-ionic surfactants as described in the paper of 1954 (Griffin, William C. (1954), "Calculation of HLB Values of Non-Ionic Surfactants", Journal of the Society of Cosmetic Chemists, 5 (4): 249-56):

$$HLB = 20 \times M_h / M$$

where $M_h$ is the molecular mass of the hydrophilic portion of the molecule, and M is the molecular mass of the whole molecule, giving a result on a scale of 0 to 20. An HLB value of 0 corresponds to a completely lipophilic/hydrophobic molecule, and a value of 20 corresponds to a completely hydrophilic/lipophobic molecule.

Abbreviations $\eta_o$ Viscosity of solvent solution for K value determination
$\eta_c$ Viscosity of copolymer solution for K value determination
$\eta_{rel}$ Relation of $\eta_c$ relative to $\eta_o$
c Concentration of polymer in solution, determination of K value
wt.-% % by weight
TDS Total dissolved solids
Δp Differential pressure
PV Pore volume
RF Resistance Factor $$RF = \frac{\Delta p(\text{polymer solution})}{\Delta p(\text{base fluid})}$$

RRF Residual Resistance Factor $$RRF = \frac{\Delta p(\text{base fluid after polymer solution})}{\Delta p(\text{base fluid before polymer solution})}$$

ΔRF Differential Resistance Factor $$\Delta RF = RF_{x2} - RF_{x1}$$

$X_{1,2}$ Number of pore volumes polymer solution pumped

EXAMPLES 20 g sorbitan sesquioleate were dissolved in 160 g $C_{11}$-$C_{16}$ isoparaffin. 110 g water 36 g of aqueous ammonia solution (25%) were placed in a beaker were cooled to 5° C., then 110 g 2-acrylamido-2-methylpropane sulfonic acid were added. The pH was adjusted to 7.1 with aqueous ammonia solution. Subsequently 146.7 g acryl amide solution (50 wt.-% in water) were added.

Under vigorous stirring the aqueous monomer solution was added to the isoparaffinic mixture. The emulsion was then purged for 45 min with nitrogen.

The polymerization was started by addition of 0.5 g azobisisobutyronitrile in 12 g isoparaffin and heated to 50° C. To complete the reaction the temperature was increased to 80° C. and maintained at this temperature for 2 h. The polymer emulsion was cooled to ambient temperature. As product, a polymer emulsion was obtained.

The K-value was determined to be 248 as 0.1 wt.-% polymer solution in deionized water containing 0.5 wt.-% of an ethoxylated C13 alcohol having a HLB-value of >10.

Examples 2 to 7

Several polymer emulsions were prepared according to example 1 but solving 13 g of different hydrophilic emulsifiers with an HLB value 210 after the sorbitan sesquioleate in the C11-C16 isoparaffin. The chemical designation of the additional emulsifier (titled as second surfactant), its HLB-value and the resulting HLB of the emulsion is given in table 1.

TABLE 1

| | Second surfactant | HLB emulsifier | HLB emulsion |
|---|---|---|---|
| Ex. 1 | none | | 3.7 |
| Ex. 2 | ethoxylated sorbitan ester | 10 | 6.2 |
| Ex. 3 | ethoxylated sorbitan ester | 15 | 8.2 |
| Ex. 4 | ethoxylated sorbitan ester | 11 | 6.6 |
| Ex. 5 | dodecyl glucoside, oligomeric | 12 | 7.0 |
| Ex. 6 | branched C10-alcohol ethoxylated | 14 | 7.8 |
| Ex. 7 | branched C10-alcohol ethoxylated | 10 | 6.2 |

Examples 1 to 4 and 6 to 7 are comparative examples.

Examples 8 to 14

Viscosities and stability of polymer emulsions were evaluated, the results are summarized in table 2.

Viscosities and stability of polymer emulsions were evaluated; the results are summarized in table 2.

TABLE 2

| | Polymer emulsion of | K-value | Brookfield viscosity (Sp. 12, 12 rpm, 30° C.), mPas | Stability as separated volume (vol.-%) after 30 d or longer |
|---|---|---|---|---|
| Ex. 8 | Ex. 1 | 248 | 2463 | 60 d: 2 vol.-% |
| Ex. 9 | Ex. 2 | 242 | 665 | 40 d: 3 vol.-% |
| Ex. 10 | Ex. 3 | — | — | 0 d: 76 vol.-% |
| Ex. 11 | Ex. 4 | 242 | 860 | 30 d: 3 vol.-% |
| Ex. 12 | Ex. 5 | 247 | 713 | 71 d: 7 vol.-% |
| Ex. 13 | Ex. 6 | — | — | 0 d: 76 vol.-% |
| Ex. 14 | Ex. 7 | — | — | 0 d: 61 vol.-% |

From these results it becomes obvious that polymer emulsions stabilized by lipophilic surfactant having a HLB-value of 3.4 are stable but exhibit high viscosity.

The addition of suitable hydrophilic surfactants having a HLB-value of >11 gives polymer emulsions with significantly reduced viscosity. Ethoxylated sorbitane esters are among the emulsifiers. Also, alkyl glucosides are able to reduce the viscosity of the polymer emulsion without reducing its stability.

However, the results clearly show that not all hydrophilic surfactant are able to stabilize the emulsion. Ethoxylated alcohols as well as inappropriate ethoxylated sorbitan esters lead to complete separation of the emulsion within few hours.

Examples 15 to 17

Polymer solutions were prepared by inverting the polymer emulsions of examples 1, 4 and 5 in synthetic sea water with 55,000 ppm TDS. 1000 ppm inverting surfactant having a HLB-value of about 13 were added to the sea water, then, under stirring, polymer emulsion was added to achieve an active polymer concentration of 2000 ppm.

The polymer solutions then were injected into a sand pack characterized by a permeability of about 350 mD. The resistance factors were determined after injection of 20 and 100 pore volumes of polymer solution. The sand pack was purged using the synthetic sea water before and after injection of the polymer solution

|  | Polymer solution prepared from | $RF_{20}$ | $RF_{100}$ | $\Delta RF$ | RRF |
|---|---|---|---|---|---|
| Ex. 15 | Ex. 1 | 6.7 | 11.8 | 5.1 | 6.6 |
| Ex. 16 | Ex. 4 | 6.7 | 20.5 | 13.8 | >20 |
| Ex. 17 | Ex. 5 | 5.3 | 6.2 | 0.9 | 2.2 |

The injectivity tests show rather good injectivity of the polymer synthesized using only the first surfactant with low HLB. The addition of a high molecular weight hydrophilic surfactant leads to worse injectivity performance.

In contrast, the addition of al low molecular weight alkyl polyglucoside during polymerization leads to improved injectivity.

Various non-limiting embodiments of the invention include the following.

A method for treatment of subterranean oil and gas reservoirs comprising the steps of
(i) providing a water-in-oil polymer emulsion containing water-soluble polymer in the aqueous phase, the aqueous phase finely dispersed in the continuous hydrophobic organic phase and the droplets stabilized by a surfactant package containing a first surfactant having a HLB-value between 3 and 9 and a second surfactant being an alkyl polyglycoside having a HLB-value of greater than 11 or a mixture of alkyl polyglycosides having a HLB-value of greater than 11,
(ii) preparing an aqueous treatment fluid by inversion of said emulsion into water that may contains salts and optionally an inverter surfactant composition,
(iii) optionally adding additives, e.g. oxygen and/or radical scavenger and
(iv) introducing the aqueous treatment fluid into the subterranean oil and gas reservoir formation.

The method as described in the paragraph above, wherein the aqueous phase which includes the water-soluble polymer is present in an amount from 40 to 90 wt.-%, preferable 60 to 75 wt.-%, based on the total emulsion.

The method as described in any of the prior two paragraphs above, wherein the polymer, preferably the copolymer or terpolymer, content of the water-in-oil emulsion is from 20 to 50 wt-%, preferably between 25 to 35 wt.-%, based on the total emulsion.

The method as described in any of the three paragraphs above, wherein the water-soluble polymer is a synthetic polymer, preferably a synthetic copolymer or terpolymer.

The method as described in any of the four paragraphs above, wherein the synthetic polymer comprises:
(I) at least structural units of formula (I)

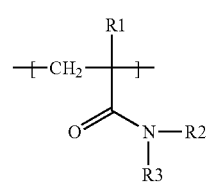

(I)

wherein
R1, R2 and R3 independently are hydrogen or $C_1$-$C_6$-alkyl,
(II) from 0 to 95% by weight structural units of formula (II)

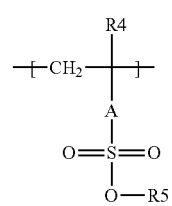

(II)

wherein
R4 is hydrogen or $C_1$-$C_6$-alkyl,
R5 is hydrogen, a cation of an alkaline metal, of an earth alkaline metal, of ammonia and/or of an organic amine,
A is a covalent C—S bond or a two-valent organic bridging group,
(III) from 0 to 30% by weight structural units of formula (III)

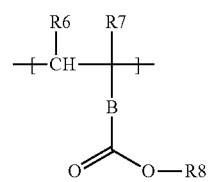

(III)

wherein
B is a covalent C—C bond or a two-valent organic bridging group
R6 and R7 are independently of one another hydrogen, $C_1$-$C_6$-alkyl, —COOR9 or —CH$_2$—COOR9, with R$_9$ being hydrogen, a cation of an alkaline metal, of an earth alkaline metal, of ammonia and/or of an organic amine,
R8 is hydrogen, a cation of an alkaline metal, of an earth alkaline metal, of ammonia and/or of an organic amine, or is $C_1$-$C_6$-alkyl, a group —$C_nH_{2n}$—OH with n being an integer between 2 and 6, preferably 2, or is a group —$C_oH_{2o}$—NR10R11, with o being an integer between 2 and 6, preferably 2, and R10 and R11 are independently of one another hydrogen or $C_1$-$C_6$-alkyl, preferably hydrogen, (IV) from 0 to 50% by weight structural units of formula (IV)

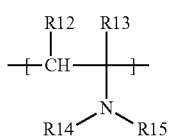
(IV)

wherein
R12 and R13 are independently of one another hydrogen, $C_1$-$C_6$-alkyl, —COOR16 or —$CH_2$—COOR16, with
R16 being hydrogen, a cation of an alkaline metal, of an earth alkaline metal, of ammonia and/or of an organic amine,
R14 is hydrogen or, $C_1$-$C_6$-alkyl, and
R15 is —COH, —CO—$C_1$-$C_6$-alkyl or
R14 and R15 together with the nitrogen atom to which they are attached form a heterocyclic group with 4 to 6 ring atoms, preferably a pyridine ring, a pyrrolidone ring or a caprolactame ring, (V) from 0 to 20% by weight structural units of formula (V)

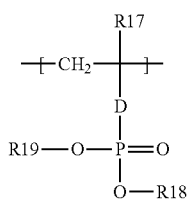
(V)

wherein
D is a covalent C—P bond or a two-valent organic bridging group
R17 is hydrogen or, $C_1$-$C_6$-alkyl, and
R18 and R19 are independently of one another hydrogen, a cation of an alkaline metal, of an earth alkaline metal, of ammonia and/or of an organic amine,
B is a covalent C—P bond or a two-valent organic bridging group, (VI) optionally further copolymerisable monomers, such copolymerisable monomers being present from 0 to 20% by weight structural units, with the proviso that the percentage of the structural units of formulae (I) to (VI), preferably the structural units of formulae (I) to (V), refer to the total mass of the copolymer and the percentage of the structural units of formulae (I) to (VI), preferably the structural units of formulae (I) to (V), amounts to 100%.

The method as described above paragraph, wherein the synthetic copolymer is selected from the group consisting of polymers containing:
(I) 10 to 90% by weight of structural formula I, preferred from 20 to 70% by weight,
(II) 0 to 95% by weight of structural formula II, preferred from 10 to 80% by weight, more preferred from 20 to 60% by weight,
(III) 0 to 30% by weight of structural formula III, preferred from 0 to 20% by weight, more preferred 0.1 to 1% by weight,
(IV) 0 to 50% by weight of structural formula IV, preferred from 0 to 20% by weight, more preferred from 0.1 to 10% by weight,
(V) 0 to 20% by weight of structural formula V, preferred from 0.1 to 10% by weight,
referred to the total mass of the polymer, with the proviso that the percentage of the structural units of formulae (I) to (V) refer to the total mass of the copolymer and the percentage of the structural units of formulae (I) to (V) amounts to 100%.

The method as described in any of the six paragraphs above, wherein the average molecular weight of the polymer, preferably the co- or ter-polymer, is higher than 1,000,000 Dalton, preferably higher than 3,000,000 Dalton.

The method as described in any of the seven paragraphs above, wherein the polymer is a copolymer having a K-value of higher than 180 determined as 0.1 wt.-% copolymer concentration in deionized water, preferably of higher than 200.

The method as described in any of the eight paragraphs above, wherein the alkyl polyglycoside(s) have a molecular weight of less than 950 g/mol.

The method as described in any of the nine paragraphs above, wherein the alkyl polyglycoside(s) consist of 1 to 5 glycoside units, preferred of 1 to 3 glycoside units, most preferred 1 or 2 glycoside units.

The method as described in any of the ten paragraphs above, wherein the alkyl side chain of the alkyl polyglycoside(s) consists of alkyl groups with an uniform number of up to 12 C-atoms or different length with up to 16 C-atoms.

The method as described in any of the eleven paragraphs above, wherein the alkyl polyglycoside(s) are octyl- to dodecyl polyglucosides having 1 to 3 glucoside units and mixtures thereof.

The method as described in any of the twelve paragraphs above, wherein the emulsion has a viscosity of less than 1000 mPas.

The method as described in any of the thirteen paragraphs above, wherein the water-soluble polymer in the aqueous phase has a solubility in distilled water of at least 0.5% by weight at 30° C.

The method as described in any of the fourteen paragraphs above, wherein the total amount of first and second surfactant(s) ranges from 0.6 to 10 wt.-%, preferably from 1 to 9 wt.-%, of the total emulsion.

The method as described in any of the fifteen paragraphs above, wherein the ratio of the first and the second surfactant may vary between 0.5 to 1 and 8 to 1, preferably between 1 to 1 and 4 to 1.

The method as described in any of the sixteen paragraphs above, wherein the first surfactant is present in an amount in the range of from about 0.5 wt.-% to about 6 wt.-% of the total emulsion and the second surfactant is present in an amount in the range of from about 0.1 wt.-% to about 4 wt.-% of the total emulsion, the ratio of the first and the second surfactant is between 0.5 to 1 and 8 to 1, preferably between 1 to 1 and 4 to 1.

The method as described in any of the sixteen paragraphs beginning at page 23, line 24, wherein the polymer, preferably the copolymer or terpolymer, and is produced by an inverse emulsion polymerization method comprising the steps of (i) preparation of an aqueous monomer solution, if necessary, adjusting pH value of the aforementioned monomer solution,
(ii) preparation of an organic solution consisting of a water-immiscible organic liquid that does not interfere with the polymerization reaction, said organic solution containing a surfactant package,
(iii) addition of the aqueous phase of step (i) to the organic phase of step (ii) to prepare a water-in-oil emulsion,
(iv) removal of oxygen and initiation of the polymerization reaction by addition of one or more compounds that form radicals
(v) adjusting reaction temperature by cooling or heating to allow complete conversion of the monomers into a polymer as defined in claim 5 as recited below,
(vi) optionally addition of an inverter surfactant for facilitated inversion or further additives,
wherein
the surfactant package containing a first surfactant having a HLB-value between 3 and 9 and a second surfactant having a HLB-value of greater than 11, said second surfactant is an alkyl polyglycoside or a mixture of alkyl polyglycosides.
The method as described in any of the eighteen paragraphs above, wherein the treatment of the subterranean oil and gas reservoir is for enhanced oil recovery.
A method of use of a water-in-oil polymer emulsion containing water-soluble polymer in the aqueous phase, the aqueous phase finely dispersed in the continuous hydrophobic organic phase and the droplets stabilized by a surfactant package containing a first surfactant having a HLB-value between 3 and 9 and a second surfactant being an alkyl polyglycoside having a HLB-value of greater than 11 or a mixture of alkyl polyglycosides having a HLB-value of greater than 11,
for preparing an aqueous treatment fluid by inversion of said emulsion into water, said aqueous treatment fluid being a fluid for treatment of subterranean oil and gas reservoirs, in particular in enhanced oil recovery.
The use as described in the preceding paragraph, wherein the polymer is defined in one or more or claims 2 to 8 and/or 14 and the polyglycoside is defined in one or more of claims 9 to 12 and/or 15 to 17 and the water-in-oil emulsion is defined in claim 13, the claims being recited below.
An aqueous treatment fluid for treatment of subterranean oil and gas reservoirs, in particular in enhanced oil recovery, said treatment fluid being obtained by inversion of a water-in-oil polymer emulsion, wherein the water-in-oil polymer emulsion containing water-soluble polymer in the aqueous phase, the aqueous phase finely dispersed in the continuous hydrophobic organic phase and the droplets stabilized by a surfactant package containing a first surfactant having a HLB-value between 3 and 9 and a second surfactant being an alkyl polyglycoside having a HLB-value of greater than 11 or a mixture of alkyl polyglycosides having a HLB-value of greater than 11.
The treatment fluid as described in the preceding paragraph, wherein the polymer is defined in one or more of the preceding paragraphs and the polyglycoside is defined in one or more of the preceding paragraphs and the water-in-oil emulsion is defined above.

The invention claimed is:

1. A method for treatment of subterranean oil and gas reservoirs comprising the steps of:
(i) providing a water-in-oil polymer emulsion containing water-soluble polymer in the aqueous phase, the aqueous phase finely dispersed in the continuous hydrophobic organic phase and the droplets stabilized by a surfactant package containing a first surfactant having a HLB-value between 3 and 9 and a second surfactant being an alkyl polyglycoside having a HLB-value of greater than 11 or a mixture of alkyl polyglycosides having a HLB-value of greater than 11, the water-soluble polymer is a synthetic copolymer or terpolymer, having an average molecular weight higher than 1,000,000 Dalton, and the water-in-oil polymer emulsion having a viscosity of less than 1000 mPas,
(ii) preparing an aqueous treatment fluid by inversion of said emulsion into water that may contains salts and optionally an inverter surfactant composition,
(iii) optionally adding additives, e.g. oxygen and/or radical scavenger and
(iv) introducing the aqueous treatment fluid into the subterranean oil and gas reservoir formation.

2. The method of claim 1, wherein the aqueous phase which includes the water-soluble polymer is present in an amount from 40 to 90 wt. %, based on the total emulsion.

3. The method of claim 1, wherein the polymer is a copolymer or terpolymer and the content of the water-in-oil emulsion is from 20 to 50 wt. %, based on the total emulsion.

4. The method of claim 1, wherein the synthetic polymer comprises:
(I) at least structural units of formula (I)

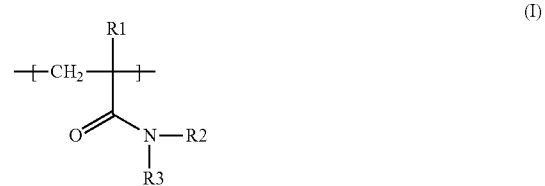

wherein
R1, R2 and R3 independently are hydrogen or $C_1$-$C_6$-alkyl,
(II) from 0 to 95% by weight structural units of formula (II)

wherein
R4 is hydrogen or $C_1$-$C_6$-alkyl,
R5 is hydrogen, a cation of an alkaline metal, of an earth alkaline metal, of ammonia and/or of an organic amine,
A is a covalent C—S bond or a two-valent organic bridging group, (III) from 0 to 30% by weight structural units of formula (III)

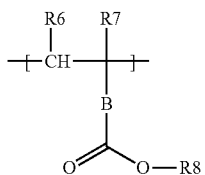

(III)

wherein

B is a covalent C—C bond or a two-valent organic bridging group

R6 and R7 are independently of one another hydrogen, $C_1$-$C_6$-alkyl, —COOR$_9$ or —CH$_2$—COOR$_9$, with R$_9$ being hydrogen, a cation of an alkaline metal, of an earth alkaline metal, of ammonia and/or of an organic amine, R8 is hydrogen, a cation of an alkaline metal, of an earth alkaline metal, of ammonia and/or of an organic amine, or is $C_1$-$C_6$-alkyl, a group —$C_nH_{2n}$—OH with n being an integer between 2 and 6, or is a group —$C_oH_{2o}$—NR10R11, with o being an integer between 2 and 6, and R10 and R11 are independently of one another hydrogen or $C_1$-$C_6$-alkyl, (IV) from 0 to 50% by weight structural units of formula (IV)

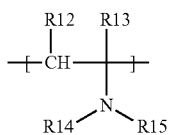

(IV)

wherein

R12 and R13 are independently of one another hydrogen, $C_1$-$C_6$-alkyl, —COOR16 or —CH$_2$—COOR16, with R16 being hydrogen, a cation of an alkaline metal, of an earth alkaline metal, of ammonia and/or of an organic amine, R14 is hydrogen or, $C_1$-$C_6$-alkyl, and R15 is —COH, —CO—$C_1$-$C_6$-alkyl or R14 and R15 together with the nitrogen atom to which they are attached form a heterocyclic group with 4 to 6 ring atoms, (V) from 0 to 20% by weight structural units of formula (V)

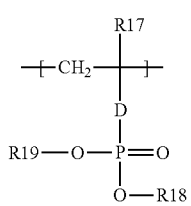

(V)

wherein

D is a covalent C—P bond or a two-valent organic bridging group

R17 is hydrogen or, $C_1$-$C_6$-alkyl, and

R18 and R19 are independently of one another hydrogen, a cation of an alkaline metal, of an earth alkaline metal, of ammonia and/or of an organic amine, B is a covalent C—P bond or a two-valent organic bridging group, (VI) optionally further copolymerisable monomers, such copolymerisable monomers being present from 0 to 20% by weight structural units, with the proviso that the percentage of the structural units of formulae (I) to (VI), refer to the total mass of the copolymer and the percentage of the structural units of formulae (I) to (VI), amounts to 100%.

5. The method of claim 4, wherein the synthetic copolymer is selected from the group consisting of polymers containing:

(I) 10 to 90% by weight of structural formula I, (II) 0 to 95% by weight of structural formula II, (III) 0 to 30% by weight of structural formula III, (IV) 0 to 50% by weight of structural formula IV, (V) 0 to 20% by weight of structural formula V, referred to the total mass of the polymer, with the proviso that the percentage of the structural units of formulae (I) to (V) refer to the total mass of the copolymer and the percentage of the structural units of formulae (I) to (V) amounts to 100%.

6. The method of claim 1, wherein the polymer is a copolymer having a K-value of higher than 180 determined as 0.1 wt.-% copolymer concentration in deionized water.

7. The method of claim 1, wherein the alkyl polyglycoside(s) have a molecular weight of less than 950 g/mol.

8. The method of claim 1, wherein the alkyl polyglycoside(s) consist of 1 to 5 glycoside units.

9. The method of claim 1, wherein the alkyl side chain of the alkyl polyglycoside(s) consists of alkyl groups with an uniform number of up to 12 C-atoms or different length with up to 16 C-atoms.

10. The method of claim 1, wherein the alkyl polyglycoside(s) are octyl- to dodecyl polyglucosides having 1 to 3 glucoside units and mixtures thereof.

11. The method of claim 1, wherein the water-soluble polymer in the aqueous phase has a solubility in distilled water of at least 0.5% by weight at 30° C.

12. The method of claim 1, wherein the total amount of first and second surfactant(s) ranges from 0.6 to 10 wt. %, of the total emulsion.

13. The method of claim 1, wherein the ratio of the first and the second surfactant may vary between 0.5 to 1 and 8 to 1.

14. The method of claim 1, wherein the first surfactant is present in an amount in the range of from about 0.5 wt. % to about 6 wt. % of the total emulsion and the second surfactant is present in an amount in the range of from about 0.1 wt. % to about 4 wt. % of the total emulsion, the ratio of the first and the second surfactant is between 0.5 to 1 and 8 to 1.

15. The method of claim 1, wherein the copolymer or terpolymer comprises:

(I) at least structural units of formula (I)

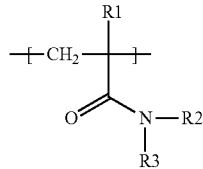
(I)

wherein
R1, R2 and R3 independently are hydrogen or $C_1$-$C_6$-alkyl, (II) from 0 to 95% by weight structural units of formula (II)

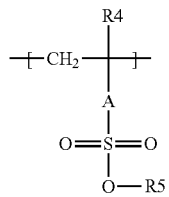
(II)

wherein
R4 is hydrogen or $C_1$-$C_6$-alkyl,
R5 is hydrogen, a cation of an alkaline metal, of an earth alkaline metal, of ammonia and/or of an organic amine,
A is a covalent C—S bond or a two-valent organic bridging group, (III) from 0 to 30% by weight structural units of formula (III)

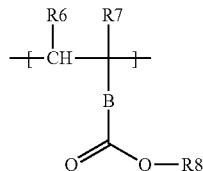
(III)

wherein
B is a covalent C—C bond or a two-valent organic bridging group
R6 and R7 are independently of one another hydrogen, $C_1$-$C_6$-alkyl, —COOR9 or —CH2—COOR9, with R9 being hydrogen, a cation of an alkaline metal, of an earth alkaline metal, of ammonia and/or of an organic amine,
R8 is hydrogen, a cation of an alkaline metal, of an earth alkaline metal, of ammonia and/or of an organic amine, or is $C_1$-$C_6$-alkyl, a group —$C_nH_{2n}$—OH with n being an integer between 2 and 6, or is a group —$C_oH_{2o}$—NR10R11, with o being an integer between 2 and 6,
R10 and R11 are independently of one another hydrogen or $C_1$-$C_6$-alkyl, (IV) from 0 to 50% by weight structural units of formula (IV)

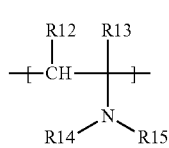
(IV)

wherein
R12 and R13 are independently of one another hydrogen, $C_1$-$C_6$-alkyl, —COOR16 or —CH2—COOR16, with
R16 being hydrogen, a cation of an alkaline metal, of an earth alkaline metal, of ammonia and/or of an organic amine,
R14 is hydrogen or, $C_1$-$C_6$-alkyl, and
R15 is —COH, —CO—$C_1$-$C_6$-alkyl or
R14 and R15 together with the nitrogen atom to which they are attached form a heterocyclic group with 4 to 6 ring atoms, (V) from 0 to 20% by weight structural units of formula (V)

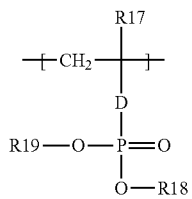
(V)

wherein
D is a covalent C—P bond or a two-valent organic bridging group
R17 is hydrogen or, $C_1$-$C_6$-alkyl, and
R18 and R19 are independently of one another hydrogen, a cation of an alkaline metal, of an earth alkaline metal, of ammonia and/or of an organic amine,
B is a covalent C—P bond or a two-valent organic bridging group, (VI) optionally further copolymerisable monomers, such copolymerisable monomers being present from 0 to 20% by weight structural units, with the proviso that the percentage of the structural units of formulae (I) to (VI), refer to the total mass of the copolymer and the percentage of the structural units of formulae (I) to (VI), amounts to 100% and is produced by an inverse emulsion polymerization method comprising the steps of:

(i) preparation of an aqueous monomer solution, if necessary, adjusting pH value of the aforementioned monomer solution, (ii) preparation of an organic solution consisting of a water-immiscible organic liquid that does not interfere with the polymerization reaction, said organic solution containing a surfactant package, (iii) addition of the aqueous phase of step (i) to the organic phase of step (ii) to prepare a water-in-oil emulsion, (iv) removal of oxygen and initiation of the polymerization reaction by addition of one or more compounds that form radicals (v) adjusting reaction temperature by cooling or heating to allow complete conversion of the monomers into a polymer, (vi) optionally addition of an inverter surfactant for facilitated inversion or further additives, wherein the surfactant package containing a first surfactant having a HLB-value between 3 and 9 and a second surfactant having a HLB-value of greater than 11, said second surfactant is an alkyl polyglycoside or a mixture of alkyl polyglycosides.

16. The method of claim 1, wherein the treatment of the subterranean oil and gas reservoir is for enhanced oil recovery.

17. The method of claim 4, wherein the synthetic copolymer is selected from the group consisting of polymers containing:

(I) from 20 to 70% by weight,
(II) from 10 to 80% by weight,
(III) from 0 to 20% by weight,
(IV) from 0 to 20% by weight,
(V) from 0.1 to 10% by weight, referred to the total mass of the polymer, with the proviso that the percentage of the structural units of formulae (I) to (V) refer to the total mass of the copolymer and the percentage of the structural units of formulae (I) to (V) amounts to 100%.

18. The method of claim 1, wherein the average molecular weight of the co- or ter-polymer, is higher than 3,000,000 Dalton.

19. The method of claim 1, wherein the polymer is a copolymer having a K-value of higher than 200 determined as 0.1 wt. % copolymer concentration in deionized water.

20. The method of claim 1, wherein the alkyl polyglycoside(s) consist of 1 to 3 glycoside units.

21. The method of claim 1, wherein the alkyl polyglycoside(s) consist of 1 or 2 glycoside units.

22. The method of claim 1, wherein the ratio of the first and the second surfactant may vary between 1 to 1 and 4 to 1.

* * * * *